United States Patent [19]

Bond

[11] Patent Number: 5,509,032
[45] Date of Patent: Apr. 16, 1996

[54] NON-ADAPTIVE AMPLITUDE-DIFFERENCE INTERFERENCE FILTER

[75] Inventor: James W. Bond, San Diego, Calif.

[73] Assignee: The United States of America as represented by the Secretary of the Navy, Washington, D.C.

[21] Appl. No.: 713,659

[22] Filed: Jun. 11, 1991

[51] Int. Cl.⁶ .................................................. H04B 15/00
[52] U.S. Cl. ............................................ 375/285; 455/63
[58] Field of Search ................................ 375/58, 51, 57; 455/63

[56] References Cited

U.S. PATENT DOCUMENTS

3,157,874  11/1964  Altar et al. .................................. 375/58
3,189,901   6/1965  Cutolo ........................................ 375/58

Primary Examiner—David C. Cain
Attorney, Agent, or Firm—Harvey Fendelman; Thomas Glenn Keough; Peter A. Lipovsky

[57] ABSTRACT

An interference suppression system utilizes a non-adaptive filter to suppress interference from bandspread communication signals. The filter is effective in the cancellation of interference from a bandspread communication signal whenever interference has a mean component several times greater than its variable component. By forming amplitude-differences, the filter is used to estimate whether the signed magnitude of a communication signal component is in-phase or 180° out-of-phase with present interference. By estimating this component, high quality reception of spread spectrum radio communication signals in an interference environment is possible.

8 Claims, 8 Drawing Sheets

NON-ADAPTIVE AMPLITUDE-DIFFERENCE INTERFERENCE FILTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates generally to the suppression of interference amongst communication signals. More particularly, the invention relates to the implementation of statistical techniques to interference suppression.

2. Description of the Related Art

Radios may receive three forms of signals: noise, interference and communication. Noise, created in the atmosphere due to natural causes such as lightning and the like, is unpredictable. Few steps are taken towards its elimination. Interference signals can be caused inadvertently, such as by several stations broadcasting on the same band, or can be caused deliberately, such as by an adversary transmitting signals to mask communication signals. Many techniques have been devised to combat interference.

As major sources of radio interference are non-Gaussian in structure, receivers effective in detecting communication signals in the presence of non-Gaussian interference have been known to estimate the statistics of this interference. This estimate is used to transform received radio signals into perceptible communication signals.

Adaptive filters have been used to perform the above functions. One adaptive filtering technique creates a transform based upon the derivative of the natural log of the probability density function (PDF) of an interference magnitude, such as signal amplitude. For sampled data, an estimation of the PDF has traditionally been obtained through estimation of a cumulative probability function of the data. Derivatives have been calculated using finite difference operations.

Such adaptive filtering techniques can be computationally complex, incapable of performing in real-time, and numerically unstable. To perform satisfactorily, these techniques often require a relatively great number of signal samples. This high sample requirement makes some adaptive approaches computationally demanding and confines their use to dedicated microprocessors, and then primarily those used with radios operating in the lower portion of the radio frequency spectrum (low frequency [LF], very low frequency [VLF], and extra low frequency [ELF]).

Though successful interference suppression has been obtained through the use of adaptive filters, such filtering devices use a great many calculations and require considerable processing. Their complex design has led to interference processors of high cost.

There is thus a need for an interference suppression system that can be used with dedicated or nondedicated microprocessors, that is suitable for use with radio frequency receivers operating over both the lower and upper portions of the radio frequency spectrum and that is relatively simple in operation, permitting interference suppression at a reasonable cost.

SUMMARY OF THE INVENTION

The invention meets these needs by providing a simpler, non-adaptive filter that can be used in place of adaptive filters. This non-adaptive filter provides similar performance to adaptive filters for many kinds of interference suppression. The non-adaptive amplitude-difference interference filter of the invention is effective in the cancellation of interference from a bandspread communication signal whenever the communication signal has a mean component which is several times greater than its variable component and is used when interference dominates both the communication signal and Gaussian noise.

The filter operates through the determination of a sequence of signal magnitudes derived from individual samples of a received signal. By using statistical techniques, the signal magnitudes, in this case amplitudes, are used to estimate the signed magnitude of a component of the communication signal.

This estimation provides a basis for determining whether the component of the communication signal is in-phase or 180° out-of-phase with received interference. By making this estimation, high quality reception of a spread spectrum radio signal in an interference environment can be made possible.

OBJECTS OF THE INVENTION

It is an object of the invention to provide an improved interference suppression system.

Another object of the invention is to provide an interference suppression system that can be implemented through the use of dedicated or non-dedicated microprocessors.

A further object of the invention is to provide an improved interference suppression system that is operable in both the lower and upper portions of the radio frequency spectrum.

Yet a further object of the invention is to provide a computationally simple interference suppression filter.

Yet another object of the invention is to provide an interference suppression filter that is relatively inexpensive.

Other objects, advantages and new features of the invention will become apparent from the following detailed description of the invention when considered in conjunction with the accompanying drawings.

DESCRIPTION OF THE PREFERRED EMBODIMENT

Figure 1:
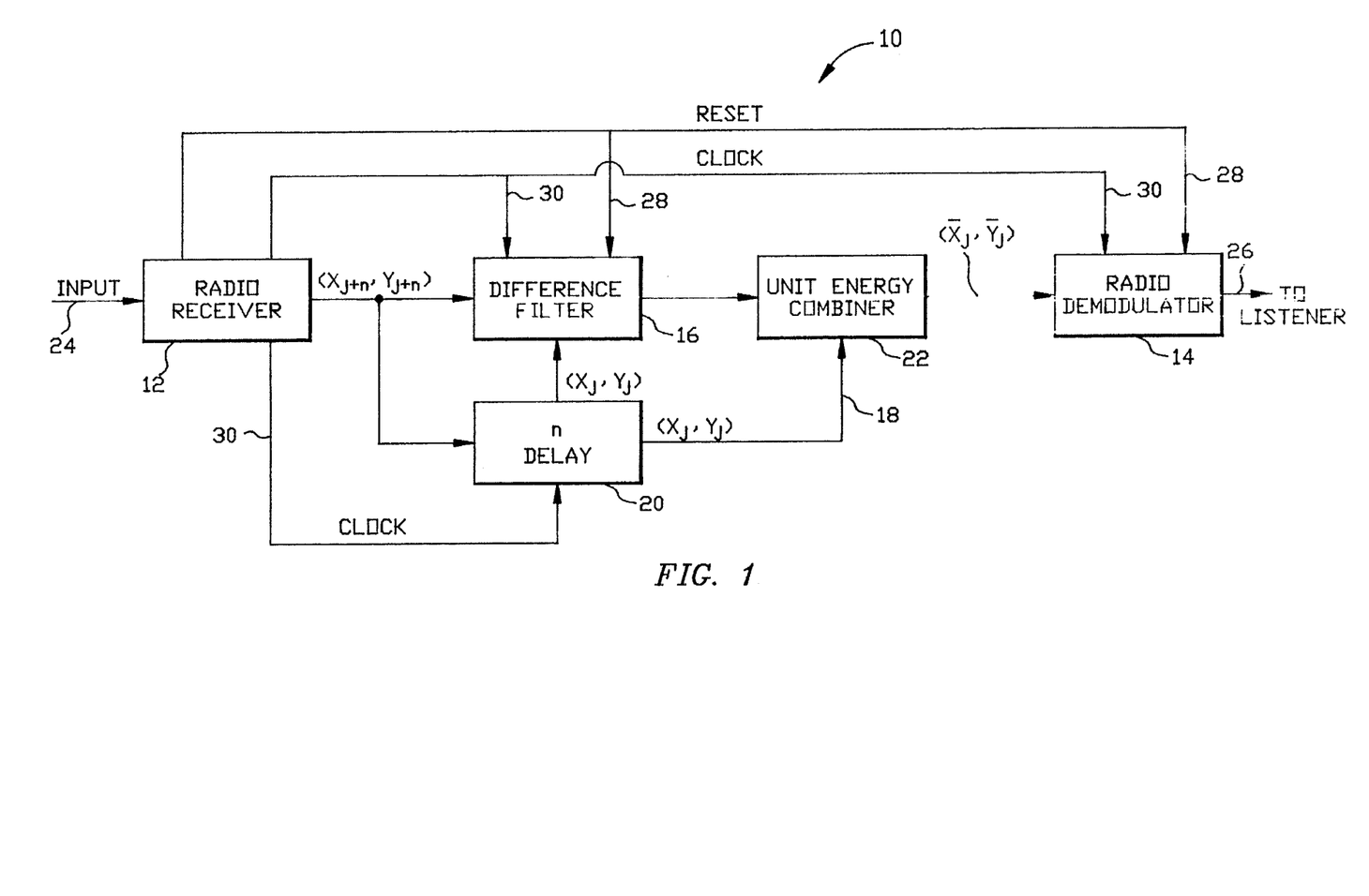
FIG. 1 is a block diagram of an interference suppression system according to the invention.

In FIG. 1 there is shown an interference suppression system 10 according to a preferred embodiment of the invention. System 10 includes components of a typical radio including a receiver 12 and a demodulator 14. As a stand-alone processor, Non-Adaptive Difference Filter 16 is inserted between receiver 12 and demodulator 14 as shown.

To provide satisfactory performance in cases where interfering noise is primarily Gaussian, Difference Filter 16 should be used in conjunction with a bleed-through path 18. This path includes a delay 20 that equals the delay through processor 16. Signals delayed through bleed-through path 18 and those output from processor 16 are normalized and combined conventionally in unit energy combiner 22. Normalization in this regard is with respect to the relative energies from processor 16's output, these energies being averaged over the received signal samples used in the processor. Normalization for the signals passed through bleed-through path 18 is with respect to the corresponding magnitudes (amplitudes) of the individual samples used in system 10.

Bleed-through path 18 and combiner 22 are needed for the invention to work properly in cases where communication signals are nearly as strong or are stronger than noise and interference.

A preferred embodiment of the invention is designed for the reception of band-spread signals having each information bit spread-by a factor of 10 or more. Of course, other spread factors may be-used. For the invention to perform satisfactorily, radio 12 must include a bypass of processor 16 for the reception of communication signals which are not spread. This bypass, not shown, may be constructed according to conventional techniques.

Radio receiver 12 converts input signals 24 into a sequence of in-phase and quadrature samples $\{x_j\}$ and $\{y_j\}$, respectively, with j being an arbitrary index. Sample pair $(x_j, y_j)$ is called a complex sample of the received signal for index j and can be viewed as a vector with x-component $(x_j)$ and y-component $(y_j)$. Signals $x_j$ and $y_j$ are the centermost pair of a representative number $(2n+1)$ or sequence of received signal samples taken: $(x_{j-n}, y_{j-n}) \ldots (x_j, y_j) \ldots (x_{j+n}, y_{j+n})$. The preferred sample rate used is twice the bandwidth of the baseband communication signal components received by radio 12.

Demodulated output 26 of system 10 is of a sequence of "transformed" in-phase and quadrature samples designated as $\{x_j\bigcirc\}$ and $\{y_j\bigcirc\}$, respectively. A reset signal 28 and a clock signal 30, derived from radio 12, are used to synchronize operation of processor 16 with radio receiver 12 and demodulator 14.

Let $r_j^2 = x_j^2 + y_j^2$ with $r_j > 0$ and being a magnitude, in this case the amplitude, of received input sample pair $(x_j, y_j)$. The processor shown in FIG. 1 forms a gain factor $g(r_j)$ which relates to input sequence $\{x_j, y_j\}$ to demodulated output sequence $\{x_j\bigcirc y_j\bigcirc\}$ by the relation:

$$(x_j\bigcirc, y_j\bigcirc) = g(r_j)(x_j/r_j, y_j/r_j).$$

The gain factor $g(r_j)$ is not only a function of $r_j$ but also of $\{r_k | j-n \leq k \leq j+n\}$, with $2n+1$ being the representative number of samples per sample sequence used in processor 16. As will be further discussed, a value of n equaling a power of 2 has been found to simplify implementation of the invention. It should noted that n, however, is an arbitrary number that may be adjusted according to user demand and results achieved.

For the very low frequency (VLF) band, simulation of the invention has provided marginal performance for n=2 and better performance for n=8. Depending on the radio used and its frequency of operation as well as the nature of the interference, allowable values of n starting with 2 to the first power and increasing to greater powers should be tried until performance levels off.

The processing taking place in the invention delays output 26 relative to input 24 by at least n samples. The delay 20 should be the same as this delay. Demodulator 14 should be modified in a conventional way to account for this delay to allow for the despreading of processed communication signals.

Figure 2:
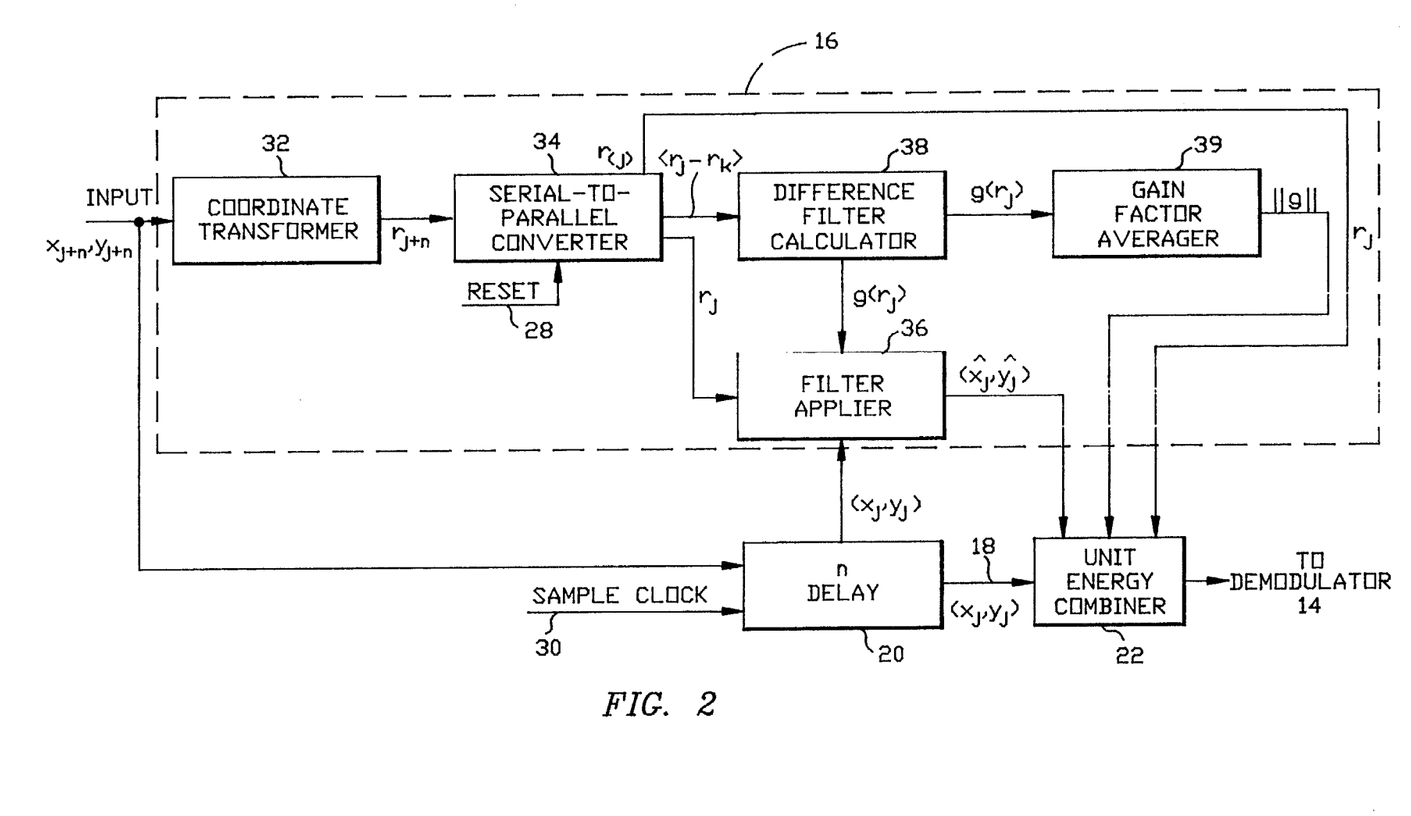
FIG. 2 is a representative implementation of an interference filter according to the invention.

In FIG. 2 there is provided a general block diagram showing the major components of Difference Filter 16, as well as time delay 20 and unit energy combiner 22. In the preferred embodiment shown, all input and output quantities are 16-bit integers and all calculations performed by the components of the filter of the invention are done with 16-bit or more precision. Of course, those skilled in the art will realize that these quantities may be changed dependent upon component availability, computation time required and/or other factors.

The invention will be described at three levels. First, the inputs and outputs will be described for each major functional block of FIG. 2. Second, the hardware and functions of each block, whose properties are not apparent, will be described. Third, a flow chart procedure will be explained describing the processing steps that take place in the invention.

The inputs and outputs of each of the major functional blocks shown in FIG. 2 are given below.

Coordinate Transformer (32)

Input: $(x_{j+n}, y_{j+n})$

Output: $r_{j+n} = \sqrt{x_{j+n}^2 + y_{j+n}^2}$

The "j+n"th sample pair is the most recently acquired sample of sample sequence $\{x_j, y_j\}$ and is shown in FIG. 2 as the input into processor 16. Since the invention cancels interference based upon a property of the received signal samples, such as signal amplitude, coordinate transformer 32 is used to calculate this property. It should noted that signal magnitude $r_{j+n}$ will equal $\sqrt{x_{j+n}^2 + y_{j+n}^2}$ unless this quantity is zero. Then $r_{j+n}$ equals the smallest number expressible in the arithmetic of the utilized machine such that $$\frac{1}{r_{j+n}}$$

will not overflow arithmetic capacity.

Serial-to-Parallel Converter (34)

Input: the sequence of sample magnitudes $\{r_j\}$ input over time (including $r_{j+n}$), reset and clock signals Output: a sequence of vectors centered about reference sample magnitude (amplitude) $r_j$, which is written as $$\langle r_j - r_k \rangle = (r_j - r_{j-n}, r_j - r_{j-(n-1)}, \ldots r_j - r_{j-1}, r_j - r_{j+1}, \ldots r_j - r_{j+n})$$

in which throughout this specification "< >" designates a vector form of the received signals with symbol "k" representing a running index based upon j that runs from k=j−n to k=j+n unless otherwise noted. This sequence of signal magnitude differences, in this case amplitude-differences, is used to calculate the transform to be applied to time delayed sample pair $(x_j, y_j)$ from n time delay 20. In FIG. 2, the output of $r_j$ is routed to Unit Energy Combiner 22 and to Filter Applier 36, to be discussed.

Difference Filter Calculator (38)

Input: $<r_j - r_k>$

Output: $g(r_j)$

Filter Applier (36)

Input: $g(r_j)$, $(x_j, y_j)$, $r_j$

Output: $(x_i \bigcirc y_j \bigcirc = (g(r_j) x_j/r_j, g(r_j) y_j/r_j)$

Gain Factor Averager (39)

Input: $g(r_j)$

Output: ||g||

Unit Energy Combiner (22)

Input: $(x_j, y_j)$, $(x_j \bigcirc y_j \bigcirc$, $r_j$, ||g||

Output: $(\bar{x}_j, \bar{y}_j) = (vs/r_j + wx_j \bigcirc ||g||, vy_j/r_j + wy_j \bigcirc ||g||)$ Unit Energy Combiner 22, and time delay 20 do not form a part of Difference Filter 16 but are shown in FIG. 2 to facilitate understanding of the invention.

The weights v and w employed within Unit Energy Combiner 22 are chosen so that the filter of the invention provides useful filter output when weak communication signals are present and provides useful bleed-through output when strong communication signals are present. For typical VLF signal environments satisfactory performance has been achieved with weight values v=1 and w=4. Of course, for other interference environments, experimentation may show that other weight values are suitable.

The hardware and operation of each of the major components shown in FIG. 2 will now be described. The components shown are assembled from conventional elements according to traditional techniques.

Figure 3:
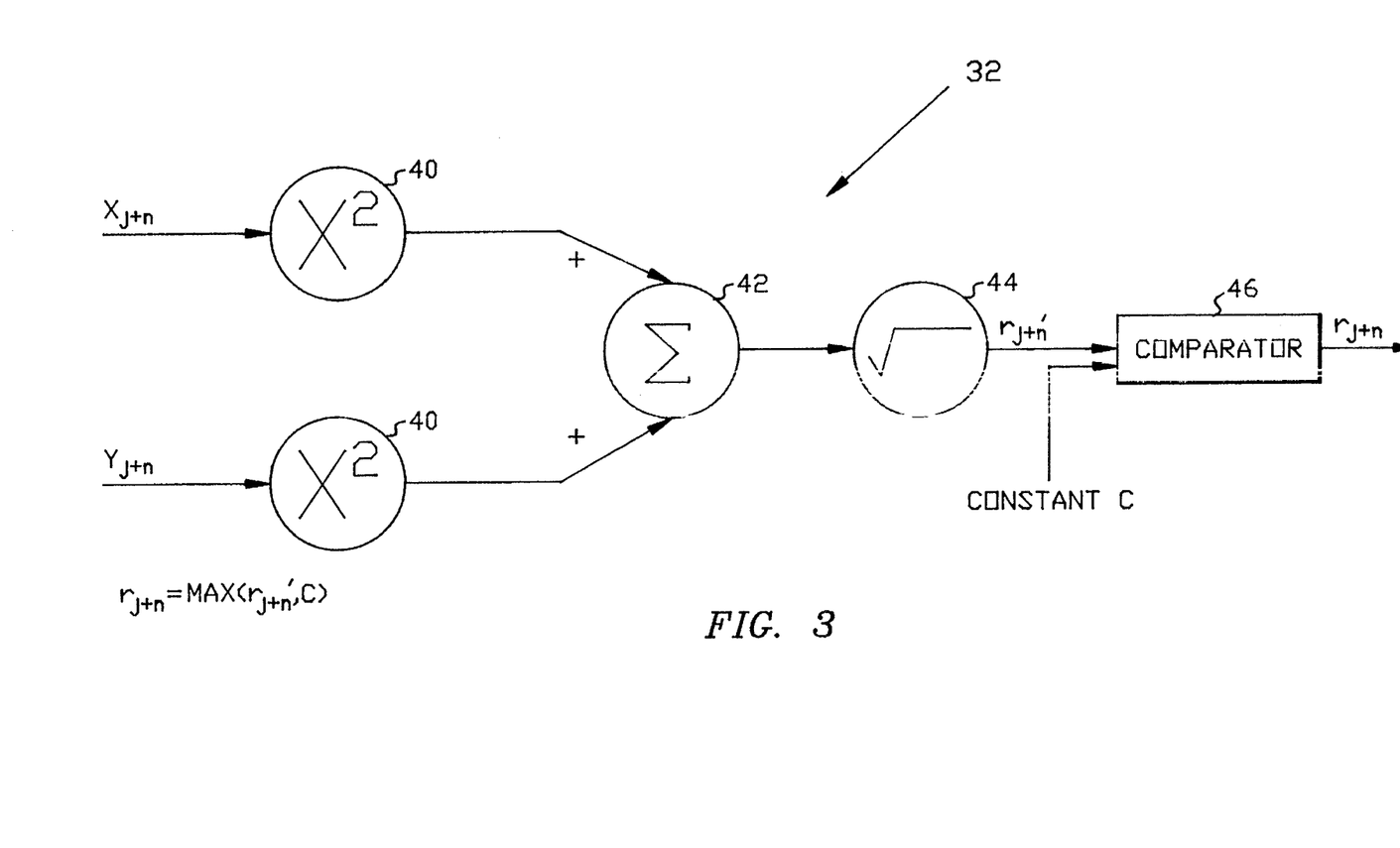
FIG. 3 is a block diagram of a coordinate transformer such as may be used in the invention.

Coordinate Transformer (32)

Coordinate Transformer 32 is shown in FIG. 3. Each component of input sequence $\{x_j, y_j\}$ goes to a squaring circuit 40.

The outputs of squaring circuits 40 are added in summer 42. In square root circuit 44 the square root of the output of summer 42 is taken to give $r_{j+n}'$. To prevent $r_{j+n}'$ from falling below a preselected value (constant C), $r_{j+n}'$ is compared with constant C in comparator 46 according to the equation $r_{j+n} = MAX(r_{j+n}', C)$ to output a controlled $r_{j+n}$ from the comparator. As previously mentioned, $r_{j+n}$ is a non-negative number that is the magnitude of the most recently acquired input sample pair $(x_{j+n}, y_{j+n})$.

Figure 4:
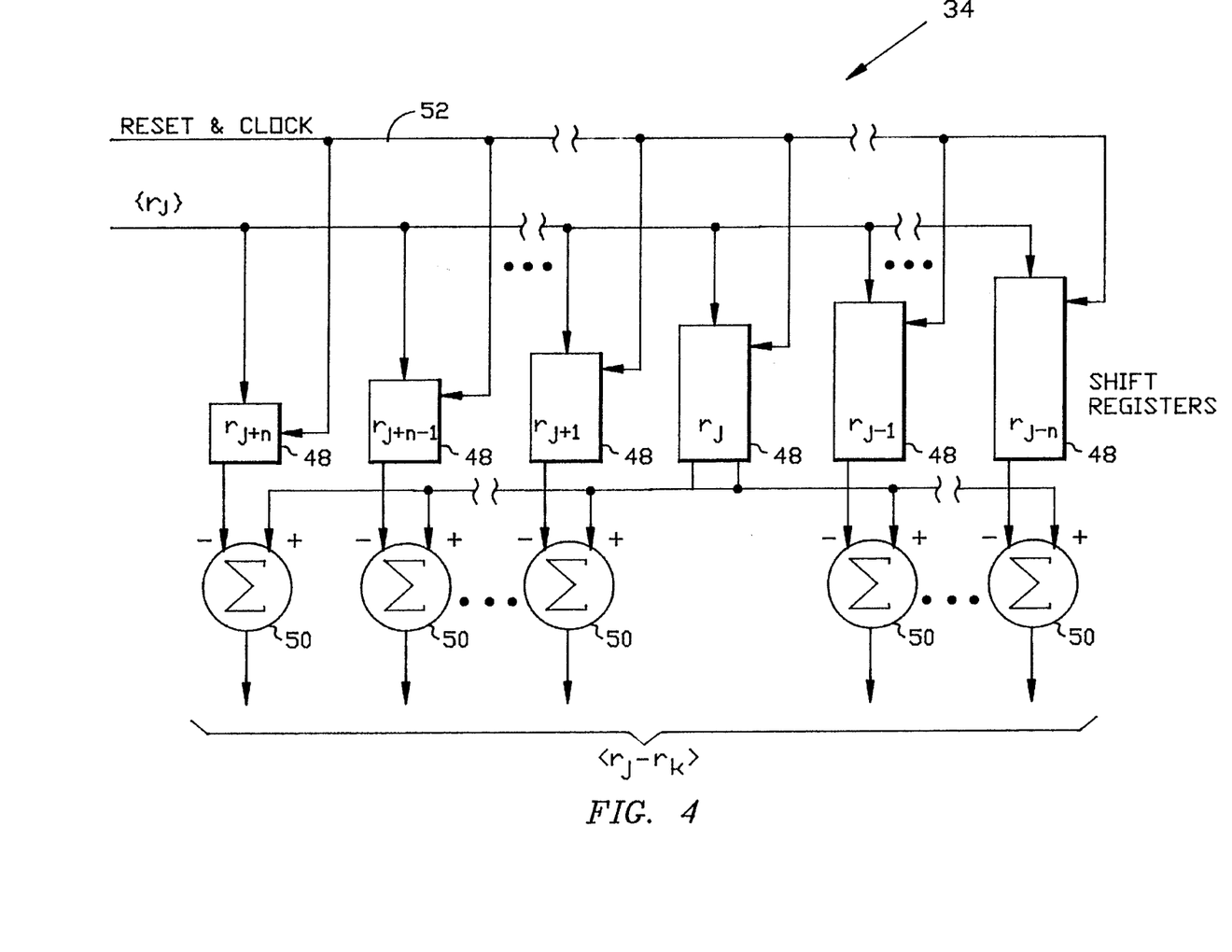
FIG. 4 is a block diagram of a serial-to-parallel converter such as may be used in the invention.

Serial-to-Parallel Converter (34)

Serial-to-parallel Converter 34 of FIG. 2 is shown in detail in FIG. 4. Recall that the input to Serial-to-parallel Converter is the sequence of signal magnitude (amplitude) values $\{r_j\}$ including most recently acquired sample magnitude $r_{j+n}$. The output of the converter is the sequence of vectors centered about sample reference magnitude $r_j$, written as $$<r_j - r_k> = (r_j - r_{j-n}, r_j - r_{j-(n-1)}, \ldots r_j - r_{j-1},$$

$$r_j - r_{j+1}, \ldots r_j - r_{j+n}).$$

This representative sequence of vectors has 2n terms and is formed by subtracting from the center reference magnitude (amplitude), $r_j$, the n magnitudes on each of its sides.

In FIG. 4 the structure of Serial-to-parallel Converter 34 is shown. The converter contains 2n+1 shift registers 48 of length 1 through 2n+1. The outputs of shift registers 48 are fed to 2n adders 50 to create the differences $$r_j - r_k, k=j-n \ldots j-1, j+1, \ldots j+n.$$

Line 52 includes reset signal 28 to reset the contents of each of the 2n+1 shift registers to 0. This reinitializes the data used in processor 16 when an operably coupled radio is tuned to a new frequency.

Figure 5:
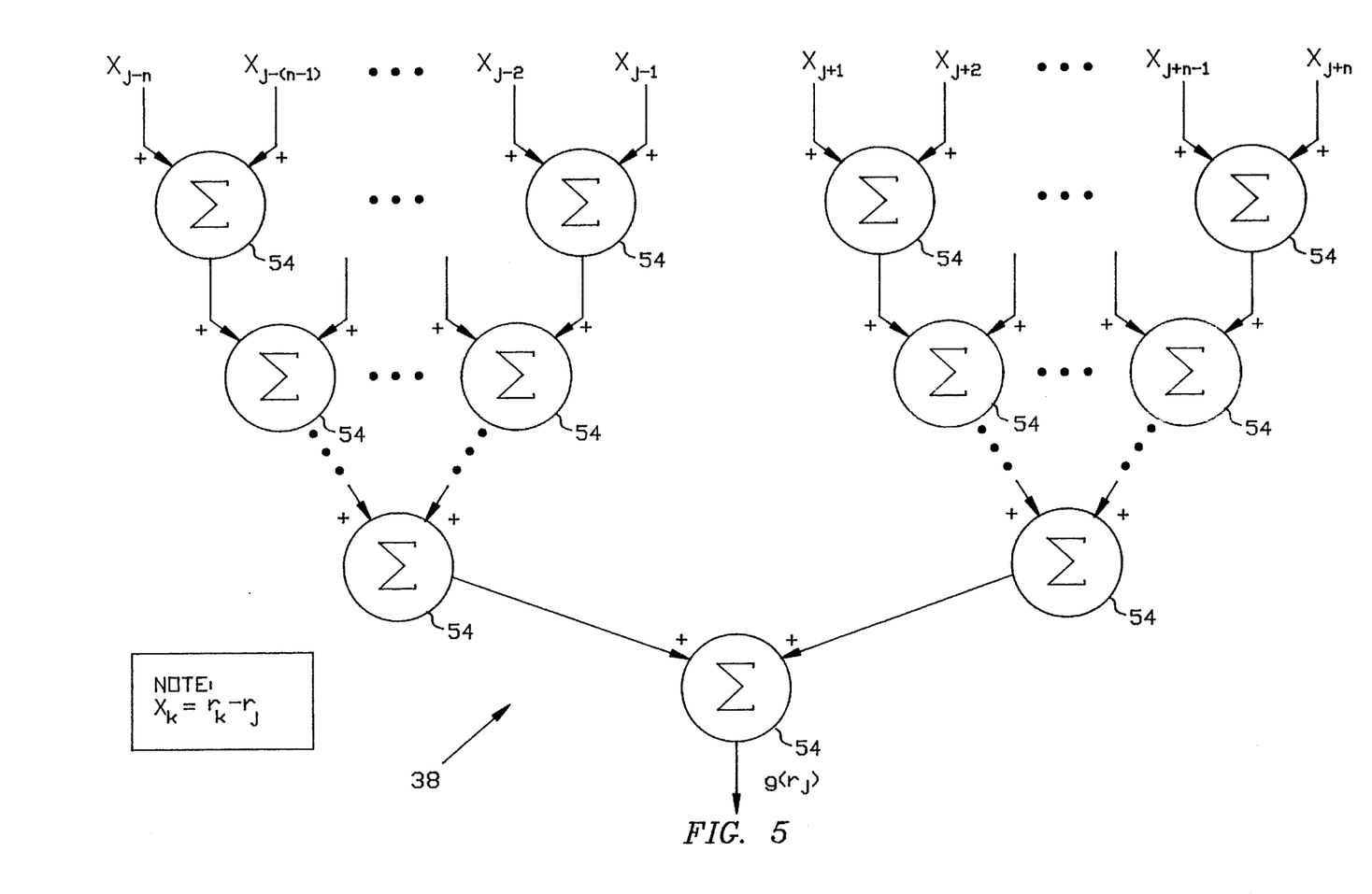
FIG. 5 is a block diagram of a difference filter calculator according to the invention.

Difference Filter Calculator (38)

Difference Filter Calculator 38 of FIG. 2 is shown in detail in FIG. 5. Difference Filter Calculator 38 uses a summing network to form as its output:

$$g(r_j) = \sum_k [r_j - r_k] \text{ for } k=j-n \text{ to } k=j+n.$$

Referring to FIGS. 2 and 5, the output of serial-to-parallel converter 34, the sequence of vectors centered about the sample reference magnitude $r_j$, $<r_j - r_k>$, provides the input to adders 54 that lie amongst the top row of the summing network of calculator 38. These inputs are shown as $x_k$ where $x_k = r_j - r_k$ and k=j−n to k=j+n.

The summing network of calculator 38 terminates as indicated because n is a power of 2. For example, when n=8, 16 inputs to the 8 adders in the first row of adders leads to 8 inputs to the 4 adders in the second row, to 4 inputs to 2 adders in the third row, to 2 inputs to a single adder in the last row of adders of the network. Generally, if $n=2^m$, the summing network would consist of m rows of adders with $2^{m-1}$ adders in the first row, $2^{m-2}$ adders in the second row, . . . , and 1 adder in the mth row which contains the fixed summand 1 as well as the two variable inputs from the m−1th row.

Figure 6:
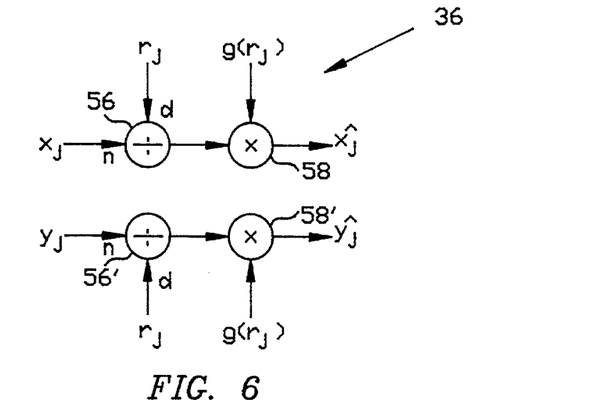
FIG. 6 is a block diagram of a filter applier as may be used in the invention.

Filter Applier (36)

Filter Applier 36 of FIG. 2 is shown in detail in FIG. 6. In FIG. 6 it can be seen that the individual components of delayed sample pair $(x_j, y_j)$ from delay 20 of FIG. 2 are individually ratioed with sample reference magnitude $r_j$ in dividers 56 and 56', respectively. The outputted ratios are multiplied by gain factor $g(r_j)$ in multipliers 58 and 58', respectively.

Figure 7:
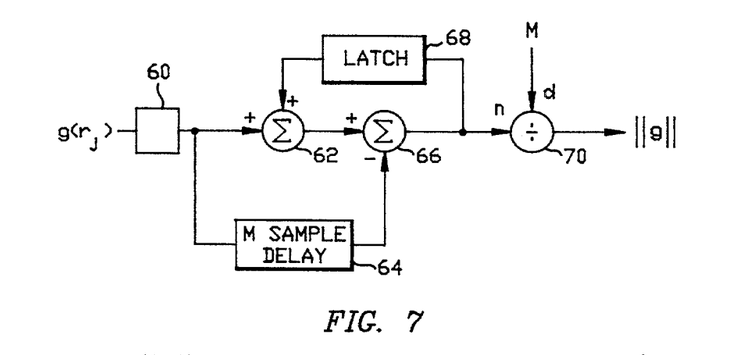
FIG. 7 is a block diagram of a gain factor averager such as may be used in the invention.

Gain Factor Averager (39)

Gain Factor Averager (39), shown in FIG. 2 is shown in greater detail in FIG. 7. As can be seen in FIG. 7, the Gain Factor $g(r_j)$ from difference filter calculator 38 of FIG. 2 is input into an absolute value component 60 to calculate the absolute value of $g(r_j)$. The output of absolute value component 60 is passed to a summer 62 and an m sample delay 64, the output of these being summed in a summer 66 and recirculated by way of latch 68 to be summed with new inputs in summer 62. The succession of values added by summers 60 and 62 are eventually passed to divider 70 where 1/M is multiplied times summer 66's output, resulting in ||g||, the average value of gain factor $g(r_j)$ over a period of M samples of (2n+1) samples per sequence. Gain Factor Averager 38 performs the calculation $$\|g\| = 1/M \sum_{i=j}^{j-M} g(r_i).$$

In this case M is determined by the user. For very low frequencies (VLF) a value of M=100 can be used to obtain satisfactory results.

Figure 8:
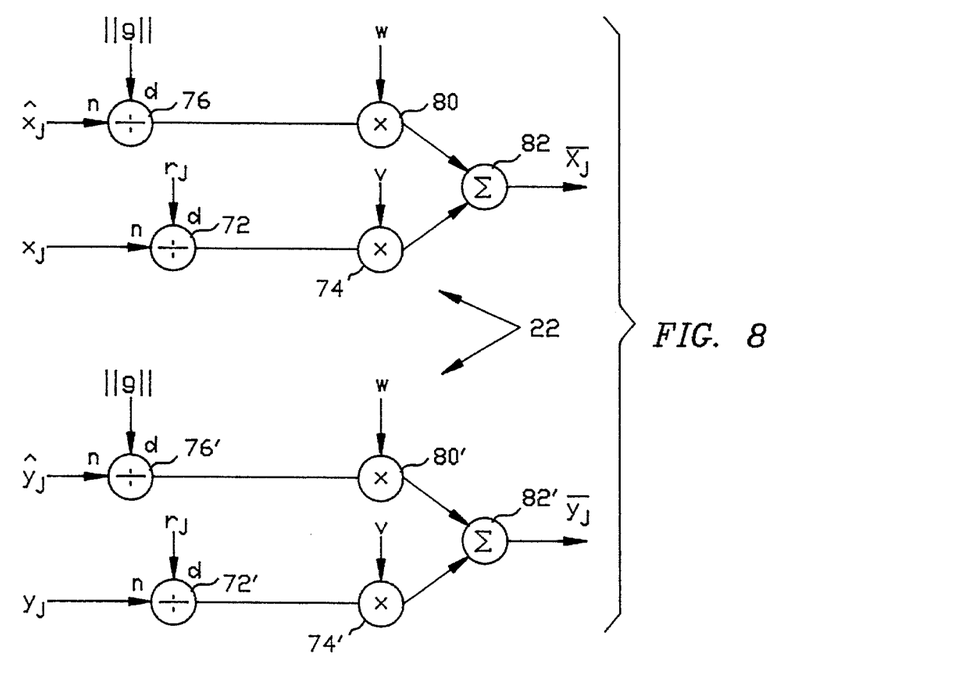
FIG. 8 is a unit energy combiner as may be utilized in the invention.

Unit Energy Combiner (22)

Unit Energy Combiner 22 shown in FIGS. 1 and 2 is shown in detail in FIG. 8. As can be seen, delayed sample components $x_j$ and $y_j$ are ratioed with sample reference magnitude $r_j$ in dividers 72 and 72', respectively, and the output then being multiplied by weight v in multipliers 74 and 74', respectively. Similarly, processed samples $(x_j\bigcirc, y_j\bigcirc)$ are individually ratioed with averaged gain factor $\|g\|$ in dividers 76 and 76', respectively, with the output of these dividers then being multiplied by weight w in multipliers 78 and 78', respectively. The weight multiplied "x" components are summed in summer 82 to produce the $\bar{x}_j = vx_j/r_j + wx_j\bigcirc\|g\|$ portion of the output of energy combiner 22. In a like manner the weight multiplied "y" components are summed in summer 64' to produce the "y" output components $\bar{y}_j = vy_j/r_j + wy_j\bigcirc\|g\|$ of combiner 22.

The principle of operation of the invention is that the formation of the sum $r_j - r_k$ over the index k estimates the signed (+ or −) magnitude of a component of a communications signal that is either in-phase or 180° out-of-phase with present interference. By estimating this component of a receive signal, high quality reception of a spread spectrum radio communications signal is possible even in an interference environment.

The baseband expression of the received signal R(t) is assumed to have the following form:

$$R(t) = U(t) + S(t) + N(t),$$

where the function U(t) denotes the interference portion of the receive signal, the function S(t) that of the communication signal portion of the receive signal and the function (N(t) being the Gaussian noise component of the received signal. The functions described are all complex-valued and can be viewed as vectors.

Figure 9:
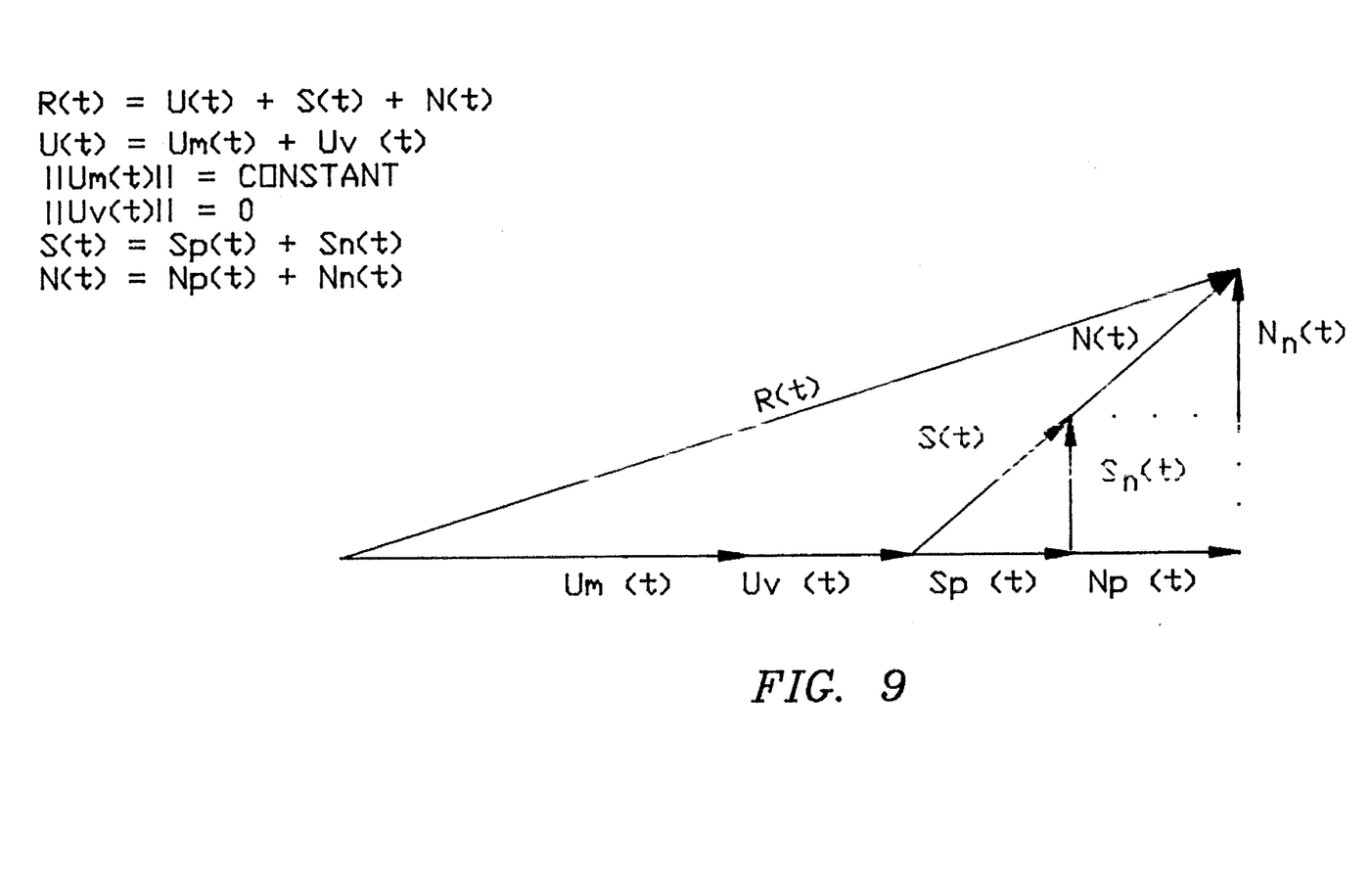
FIG. 9 is a vector interpretation of interference, communication and Gaussian noise components of a received signal.

Referring now to FIG. 9 a vector interpretation of interference, communication and Gaussian noise components of a received signal is shown. As can be seen, the vectors U(t), S(t) and N(t) are decomposed into components which permit an easy estimation of the output from the difference filter of the invention. The following description defines these components.

Using the estimation approach provided by the invention, vector U(t) is decomposed into the sum of two parallel vectors, one representing the average length of U(t), $U_m(t)$, and the other representing the variable component of U(t), $U_v(t)$. By introducing this decomposition, it can be seen that small variations in the length of the vector U(t) will not greatly impact performance of the difference filter of the invention.

The communication signal and Gaussian vectors, S(t) and N(t), respectively, are decomposed into vectors parallel to U(t), denoted by $S_p(t)$ and $N_p(t)$ and by vectors normal to U(t), these being denoted by $S_n(t)$ and $N_n(t)$. To carry out the invention, the "signed" (direction relative to U(t)) magnitudes of these component vectors are needed. Toward this end, let $\|F(t)\|$ denote the magnitude of any complex-valued function F(t).

Let $s_p(t) = U(t)^\circ S(t)/\|U(t)\|$ and $n_p(t) = U(t)^\circ N(t)/\|U(t)\|$ denote the signed magnitude of the projection of signals S(t) and N(t) onto interferer signal vector U(t), respectively. Here "°" denotes the dot product. Similarly, let $s_n(t) = U_r(t)^\circ S(t)/\|U_r(t)\|$ and $n_n(t) = U_r(t)^\circ N(t)/\|U_r(t)\|$ denote the signed magnitude of the projection of the signals S(t) and N(t) onto the interferer signal vector U(t) rotated counterclockwise through 90°, respectively. It should be noted that $s_n$ and $n_n$ do not form a part of this invention but are herein described to facilitate understanding.

The basic observation leading to the design of the difference filter of the invention follows. If $\|U(t)\| \gg \|S(t)\|$ and $\|U(t)\| \gg \|N(t)\|$ then $$|51|\ \|R(t)\| \cong \|U(t)\| + s_p(t) + n_p(t).$$

This can be observed through use of the Pythagorean Theorem:

$$\|R(t)\|^2 = (\|U(t)\| + s_p(t) + n_p(t))^2 + (s_n(t) + n_n(t))^2 \text{ from } R(t) = U(t) + S_p(t) + N_p(t) + S_n(t) + N_n(t)$$

as can be seen in FIG. 9.

It should be noted that the term $(s_n(t) + n_n(t))^2$ is negligible because $\|U(t)\|$ is much larger than either $s_n(t)$ or $n_n(t)$.

In the more general case, when the interference signal vector U(t) has some variation, the above argument leads to:

$$\|R(t)\| \cong \|U_m(t)\| + s_p(t) + u_v(t) + n_p(t).$$

The Difference Filter of the invention is only needed when the interference portion of a received signal dominates the communication signal and Gaussian noise portions. In this case the communication information contained in the magnitude of the received signal sample is information on communication portion $S_p(t)$. It will now be explained how the Difference Filter of the invention extracts this information.

The $$\sum_k [r_j - r_k]$$

formed by the Difference Filter of the invention is essentially equal to $$\sum_k [s_{pj} + u_{vj} + n_{pj} - s_{pk} - u_{vk} - n_{pk}] = (2n)(s_{pj} + u_{vj} + n_{pj}) - \sum_k [s_{pk} + u_{vk} + n_{pk}].$$

This means that the contribution of the j-th term is enhanced by a factor of 2n relative to the factors for indices other than j. Further, because the vectors $s_{pk}$, $u_{vk}$, and $n_{pk}$ are in most cases equally likely to be either positive or negative they tend to cancel each other out. The gain factor $g(r_j)$ in this sum is divided by 2n. For the invention to work satisfactorily n needs to be at least 2 with best performance being expected for n equal to at least 4 or 8 for typical VLF communication environments. Of course, experimentation should be done for other frequency conditions.

In essence, the Difference Filter of the invention cancels $U_m(t)$, the major portion of interference.

It should be noted that even a modest amount of bandspreading of the communication signal will provide sufficient processing gain to extract $s_{pj} + u_{vj} + n_{pj}$. Thus the Difference Filter of the invention allows an operably coupled radio to be used in the presence of strong levels of interference.

Figure 10:
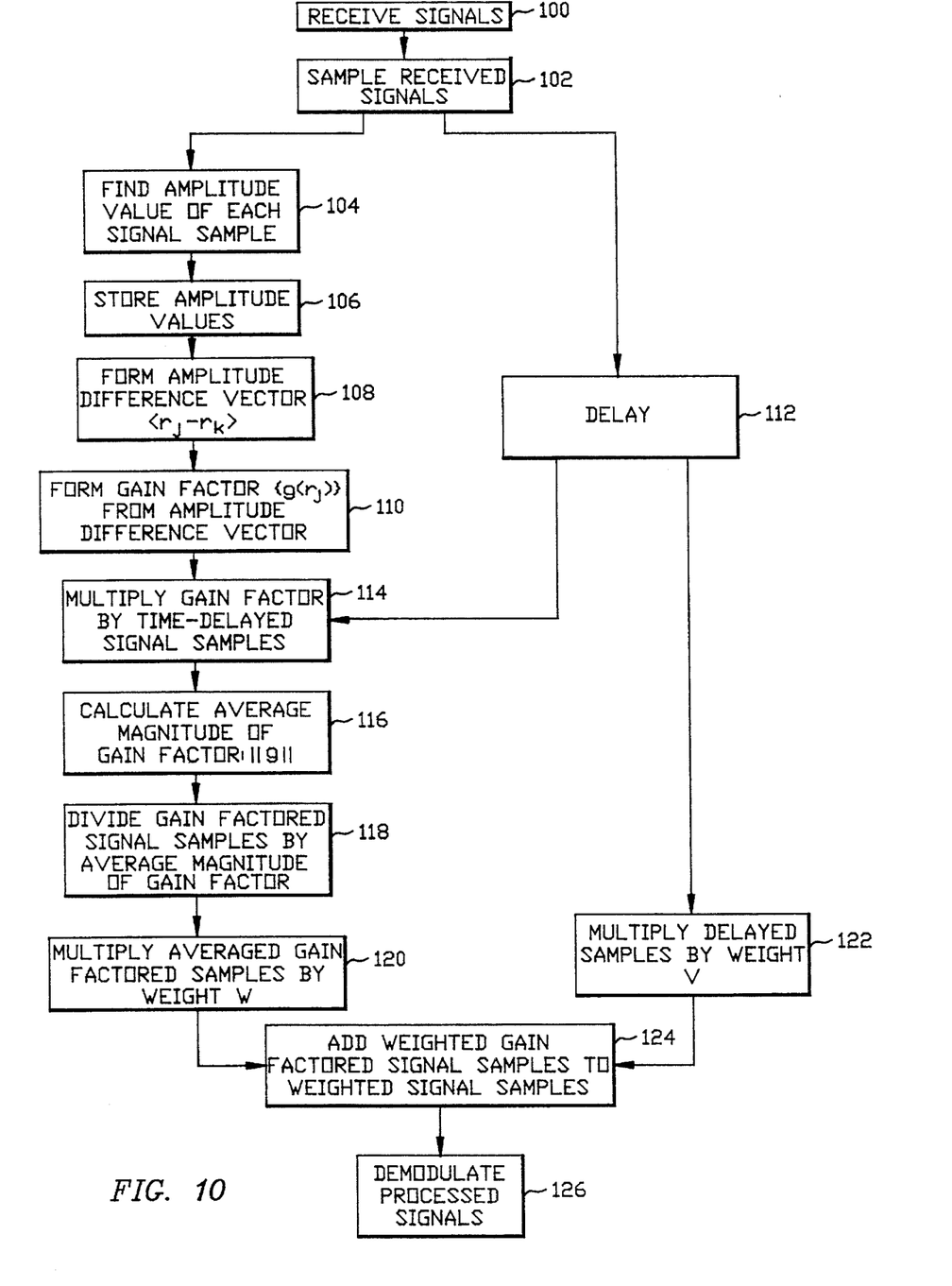
FIG. 10 is a flow chart describing various processing steps such as those that take place in a representative embodiment of the invention.

In FIG. 10 a flow chart is presented to illustrate the process utilizing the Difference Filter of the invention. Referring to this figure in conjunction with FIGS. 1 and 2, the process of the invention begins by receiving signals in step 100. These signals, such as radio frequency signals, are received by radio receiver 12 of FIG. 1. The received signals are then sampled at step 102 within receiver 12. The process of the invention is then used to calculate signal magnitude (amplitude) values for each of the signal samples. In the invention these signal amplitudes are shown calculated in step 104, this calculation taking place within Coordinate Transformer 32 of FIG. 2. The process of the invention continues with the storing of these amplitude values, step 106, taking place in Serial-to-parallel Converter 34 of FIG. 2. Also taking place in Serial-to-parallel Converter 34 is the forming of the magnitude (amplitude) difference vector $<r_j - r_k>$, step 108.

Difference Filter 16 includes Difference Filter Calculator 38 in which gain factor $[g(r_j)]$ is formed from amplitude-difference vector <$r_j-r_k$>. This is shown as step 110 in FIG. 9. While steps 104–110 take place the received signal samples from step 102 are delayed, step 112, by at least n samples in delay 20 shown in FIGS. 1 and 2 to permit processing of the corresponding samples through the invention. In step 114, the time-delayed signal samples are multiplied by gain factor $g(r_j)$ in filter applier 36 of the invention. In the next step, step 116, the gain factor average magnitude is calculated, this taking place in Gain Factor Averager 39 shown in FIGS. 2 and 7. Step 118 includes dividing the "processed" signal samples, ($x_j$◯, $y_j$◯), by the gain factor average magnitude. This takes place within Unit Energy Combiner 22.

The "averaged gain factored" signal samples are then multiplied by weight w in step 120 while the time-delayed signal samples from delay 112 are multiplied by weight v in step 122. Weight multiplication steps 120 and 122 take place within Unit Energy Combiner 22 shown in FIGS. 1 and 2. Unit Energy Combiner 22 is also used to add the "w" weighted signal samples from step 120 to the "v" weighted time-delayed signal sample from step 122. This is shown as step 124 and takes place within Unit Energy Combiner 22. As a final step, radio demodulator 14 is used to demodulate the processed signals in step 126 to make the signals usable to a listener.

As an alternative embodiment, an asymmetric Difference Filter can be obtained by summing over magnitudes calculated earlier than the most recent sample. This means that:

$$g(r_j) = \sum_k [r_j - r_k]/n \text{ where } k = j-1, j-2, \ldots j-n$$

can be used instead of running from k=j−n to k=j+n and then dividing the summation by 2n. For this design very little processing delay would be introduced. In general, the summation could run over any n consecutive samples which include the k-th sample.

Though adaptive filtering techniques are known to be successful in detecting communication signals in the presence of non-Gaussian noise, this type of detector has proven difficult to implement because of a necessity to estimate probability density functions of received signals.

The Difference Filter of the invention provides a processor which gives similar performance to that of adaptive processors when nearly constant magnitude interference exists. Compared to adaptive processors, the difference filter of the invention needs to perform fewer calculations by several orders of magnitude and therefore is less complex and can be produced more cheaply.

Obviously, many modifications and variations of the invention are possible in light of the above teachings. It is therefore to be understood that within the scope of the appended claims the invention may be practiced otherwise than has been specifically described.

What is claimed is:

1. A method comprising the steps of:

receiving signals;

sampling said signals to get signal samples;

finding a magnitude value corresponding to each of said signal samples and designating one of said magnitude values as a reference magnitude value;

storing said magnitude values;

computing differences between said reference magnitude value and said stored magnitude values;

summing said differences to form a gain factor;

multiplying said gain factor times each signal sample to obtain gain factor adjusted signal samples; and inserting said gain factor adjusted signal samples into a demodulator.

2. The method of claim 1 in which said magnitude value is signal amplitude.

3. The method of claim 1 in which said signals are radio frequency signals.

4. The method of claim 3 in which said signal samples are baseband signal samples.

5. A method comprising the steps of:

receiving signals;

sampling said signals to get a sequence of signal samples;

finding a magnitude value corresponding to each of said signal samples of said sequence of signal samples and designating one of said magnitude values as a reference magnitude value;

storing said magnitude values;

computing differences between said reference signal magnitude value and said stored signal magnitude values;

summing said differences to form a gain factor corresponding to said sequence of signal samples;

multiplying said gain factor times each signal sample of said sequence of signal samples to obtain gain factored signal samples;

repeating the above steps a preselected number of times;

averaging the gain factors formed to get an averaged magnitude gain factor;

dividing each gain factored signal sample obtained by said averaged magnitude gain factor to get averaged gain factored signal samples;

multiplying each of said averaged gain factored signal samples and each of said signal samples by respective weights to obtain weighted gain factor adjusted signal samples and weighted signal samples, respectively;

forming a sum of said weighted gain factor adjusted signal samples and said weighted signal samples; and inserting said sum into a demodulator.

6. The method of claim 5 in which said magnitude value is signal amplitude.

7. The method of claim 5 in which said signals are radio frequency signals.

8. The method of claim 7 in which said signal samples are baseband signal samples.

\* \* \* \* \*